(12) United States Patent
Manchester

(10) Patent No.: US 9,334,980 B2
(45) Date of Patent: May 10, 2016

(54) APPARATUS AND METHOD FOR BURYING ELONGATE MEMBER

(71) Applicant: IHC ENGINEERING BUSINESS LIMITED, Sliedrecht (NL)

(72) Inventor: Jonathan Ralph Manchester, Rowlands Gill (GB)

(73) Assignee: IHC ENGINEERING BUSINESS LIMITED, Stocksfield, Northumberland (GB)

( * ) Notice: Subject to any disclaimer, the term of this patent is extended or adjusted under 35 U.S.C. 154(b) by 0 days.

(21) Appl. No.: 14/366,111

(22) PCT Filed: Dec. 21, 2012

(86) PCT No.: PCT/GB2012/053225
§ 371 (c)(1),
(2) Date: Jun. 17, 2014

(87) PCT Pub. No.: WO2013/093491
PCT Pub. Date: Jun. 27, 2013

(65) Prior Publication Data
US 2014/0363237 A1     Dec. 11, 2014

(30) Foreign Application Priority Data
Dec. 21, 2011   (GB) .................................. 1122067.0

(51) Int. Cl.
*F16L 1/16*     (2006.01)
*F16L 1/032*    (2006.01)

(52) U.S. Cl.
CPC .. *F16L 1/16* (2013.01); *F16L 1/032* (2013.01)

(58) Field of Classification Search
CPC .................................... F16L 1/16; F16L 1/032
See application file for complete search history.

(56) References Cited

U.S. PATENT DOCUMENTS 781,568 A  *  1/1905  Stevens ........................ 405/183
4,140,425 A     2/1979  Flippin

FOREIGN PATENT DOCUMENTS

| | | |
|---|---|---|
| CN | 2678220 Y | 2/2005 |
| DE | 3739041 A1 | 5/1989 |
| EP | 0278705 A1 | 8/1988 |
| FR | 2781033 A1 | 1/2000 |
| GB | 1106484 A | 3/1968 |
| GB | 1117333 A | 6/1968 |
| GB | 2423778 A | 9/2006 |

* cited by examiner

*Primary Examiner* — Tara M. Pinnock
(74) *Attorney, Agent, or Firm* — Nexsen Pruet, PLLC; E. Eric Mills

(57) ABSTRACT

Apparatus and Method for Burying Elongate Member Apparatus for laying an elongate member in a trench, the apparatus comprises a main body portion; ground-contacting apparatus on which the main body portion is mounted and by which the apparatus may in use move over the ground; an elongate member moving device configured to move the elongate member from an initial position to a elongate member laying position; and a depressor attached to the main body portion and configured to guide the elongate member from its elongate member laying position to its in-trench location, the depressor having an elongate member entry portion and an elongate member exit portion, wherein the depressor is rotatable in use about an axis which is substantially parallel to the longitudinal axis of the elongate member.

9 Claims, 3 Drawing Sheets

APPARATUS AND METHOD FOR BURYING ELONGATE MEMBER

This invention relates to an apparatus and method for burying an elongate member, in particular for burying an elongate member in a pre-formed or contemporaneously-formed trench. The elongate member may typically be a pipe or cable, such as an electricity power transmission cable or a telecommunications cable.

The apparatus and method are particularly suitable for burying an elongate member such as a pipe or cable in the seabed. The apparatus and method of the invention are more especially directed to burying of an elongate member in a non-linear trench and more particularly where the trench follows a curve of relatively small radius, notably where the radius of curvature approaches the minimum radius of curvature of the elongate member.

BACKGROUND

The art of burying elongate members such as pipes or cables is well established and numerous apparatus and methods are known in the art. In many cases a trench cutting apparatus is used which, in a single operation, cuts a trench in the seabed and lays the elongate member in the newly formed trench. In some cases, the formation of the trench and the laying of the elongate member in the trench are performed as separate operations at different times and using different equipment.

Often in apparatus of this type, a so-called depressor is used during the stage of transferring the elongate member into the trench. The depressor acts to guide the elongate member to its intended location at the base or floor trench and also assists in ensuring that the elongate member is not bent further than its minimum radius of curvature which could cause damage to the elongate member.

Conventionally, apparatus for laying an elongate member in a trench is configured for laying the member in a substantially linear trench. The depressor is most often configured as a longitudinally extensive component which extends rearwardly from the apparatus and having a curved underside which acts to guide the elongate member to the base of the trench. Where the trench is linear, the rearward extent of the depressor causes no problems.

However, it is now more frequently required to lay an elongate member such as a pipe or cable in a non-linear (that is, curved) trench. In applications such as providing cables for offshore wind farms, the curve in the trench can have a small turning radius. The significant rearward extent of the depressor can become a significant problem in such curved trenches as, due to its length, the depressor may contact the walls of the trench and become wedged, or otherwise stuck or jammed in an particular location. Freeing the depressor from its jammed condition is often difficult and, at the very least, results in wasted time and money while attempts at rectification are made.

The present invention seeks to obviate or mitigate these problems.

BRIEF SUMMARY OF THE DISCLOSURE

In accordance with a first aspect of the present inventions there is provided a depressor configured for use in laying an elongate member in a trench, the depressor having an elongate member entry portion and an elongate member exit portion and wherein the depressor is rotatable in use about an axis which is substantially parallel to a longitudinal axis of the elongate member.

Preferably the axis of rotation of the depressor is substantially co-axial with the longitudinal axis of the elongate member.

Preferably the axis of rotation of the depressor is substantially parallel to the longitudinal axis of the elongate member at the elongate member entry portion of the depressor.

In preferred embodiments the elongate member is a pipe or cable.

Preferably the depressor is adapted to enable engagement and disengagement with the elongate member. In some preferred embodiments the depressor comprises a channel or groove dimensioned to engage the elongate member.

According to a second aspect of the invention there is provided apparatus for laying an elongate member in a trench, the apparatus comprising:
- a main body portion;
- ground-contacting apparatus on which the main body portion is mounted and by which the apparatus may in use move over the ground;
- an elongate member moving device configured to move the elongate member from an initial position to a elongate member laying position; and
- a depressor attached to the main body portion and configured to guide the elongate member from its elongate member laying position to its in-trench location, the depressor having an elongate member entry portion and an elongate member exit portion,
- wherein the depressor is rotatable in use about an axis which is substantially parallel to a longitudinal axis of the elongate member.

Preferably the axis of rotation of the depressor is substantially co-axial with the longitudinal axis of the elongate member.

In preferred embodiments the axis of rotation of the depressor is substantially parallel to the longitudinal axis of the elongate member at the elongate member entry portion of the depressor.

In preferred embodiments the elongate member is a pipe or cable.

Preferably the depressor is adapted to enable engagement and disengagement with the elongate member. In some preferred embodiments the depressor comprises a channel or groove dimensioned to engage the elongate member.

In preferred embodiments the apparatus further comprises trench cutting apparatus.

Preferably the trench cutting apparatus is selected from one or more of chain cutters, rock wheels, shearers and jetting apparatus.

Preferably the depressor is disposed on the apparatus immediately to the rear (with respect to the direction of trench cutting) of the trench cutting apparatus.

According to a third aspect of the invention there is provided a method of laying an elongate member into a trench the method comprising guiding the elongate member from an elongate member laying position to an in-trench location with a depressor, and, adjusting the orientation of the depressor by rotating the depressor about an axis substantially parallel to a longitudinal axis of the elongate member.

Preferably the axis of rotation of the depressor is substantially coaxial with the longitudinal axis of the elongate member.

Preferably the depressor is mounted on an elongate member laying apparatus, the method further comprising the steps of rotating the depressor about said axis when said elongate member laying apparatus is at, or approaches, a curve in the trench.

Preferably the elongate member laying apparatus further comprises trench cutting means, the method further comprising cutting the trench with said trench cutting means immediately prior to laying said elongate member in the trench.

BRIEF DESCRIPTION OF THE DRAWINGS

Embodiments of the invention are further described hereinafter with reference to the accompanying drawings, in which.

DETAILED DESCRIPTION

Figures 3A, 3B:
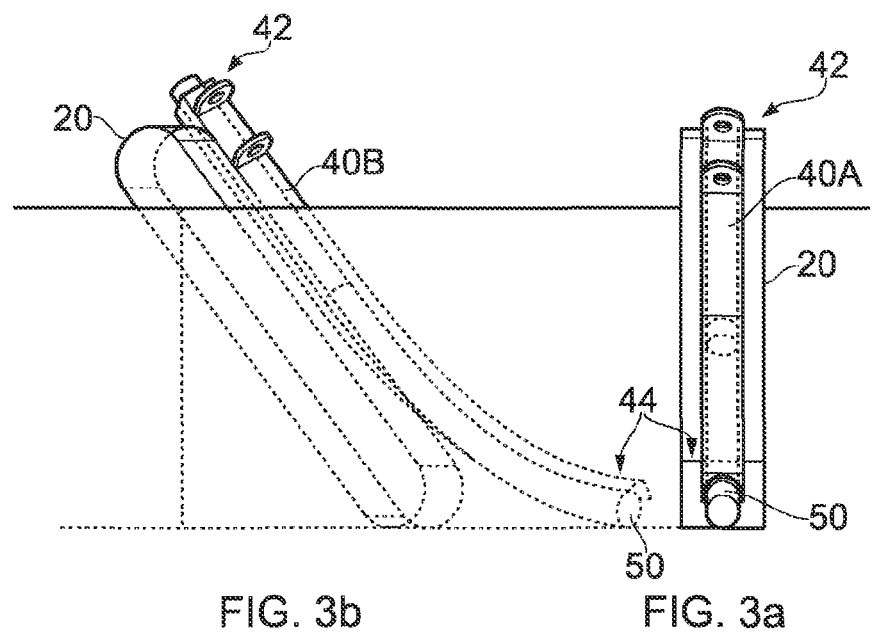
FIG. 3 shows the apparatus of the invention in side view.
Figure 4:
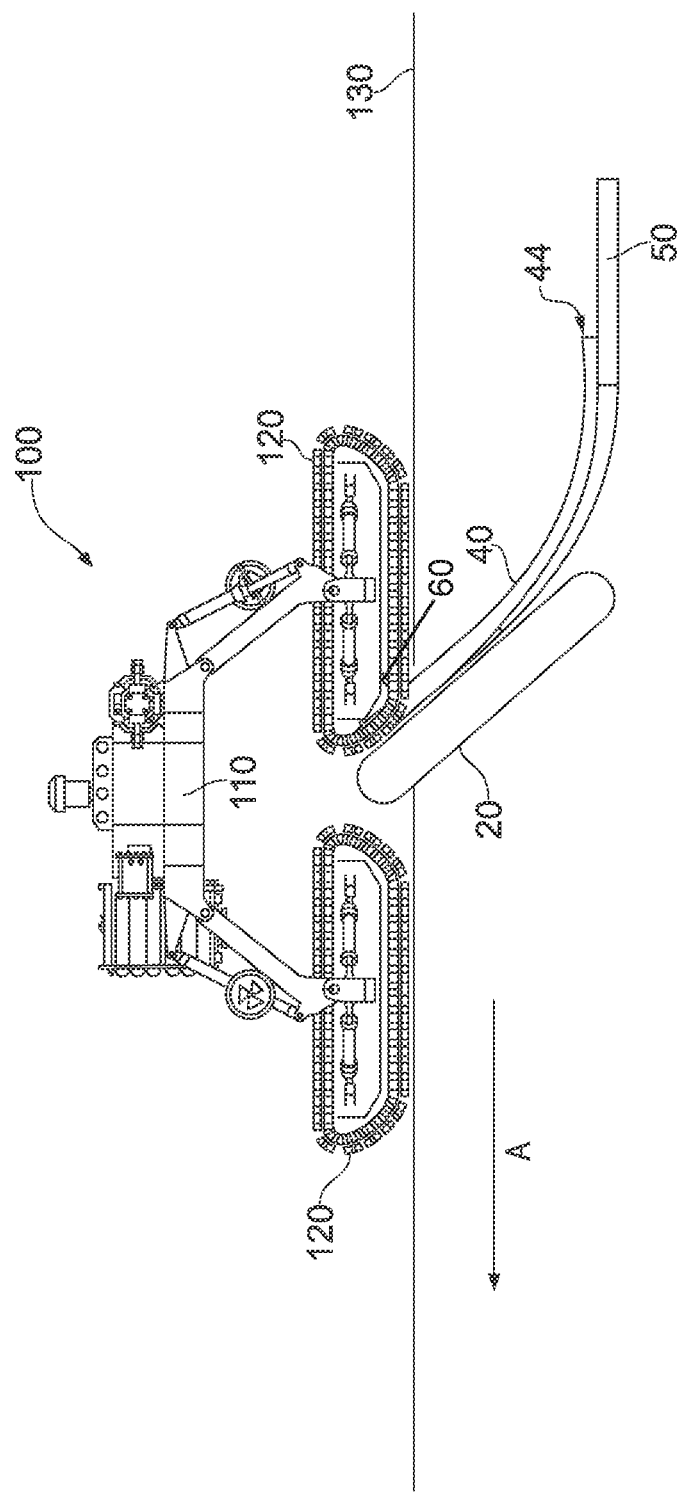
FIG. 4 is an illustration of a typical trench cutting and cable laying apparatus including a depressor.

Referring initially to FIG. 4 there is shown a typical apparatus for cutting a trench and simultaneously laying an elongate member in the newly-cut trench. The apparatus 100 comprises a main body portion 110 which is mounted on means 120 for conveying the main body portion 110 over the ground 130. The ground 130 is typically (but not exclusively) the seabed. Such means 120 are conveniently in the form of endless articulated track units (as illustrated) but could alternatively be skids or the like. The construction details of these features are not per se part of the present invention and they are not therefore illustrated in FIGS. 1 to 3. It is noted that the endless articulated track units 130 are steerable by virtue of actuators 140 mounted between main body portion 110 and the articulated track units.

The apparatus further comprises a trench cutting device 20 and a depressor 40, both indicated in outline only in FIG. 4. FIG. 4 further shows an elongate member 50 being guided into position by the depressor 40.

Although not specifically illustrated in FIG. 4, the trench cutting device 20 and the depressor 40 are mounted—directly or indirectly—on the main body portion 110 of the apparatus 100.

In the following, reference numbers of FIGS. 1 to 3 with the suffix "A" indicate parts, components and the like in a condition for laying the elongate member in a linear portion 32 of a trench, and reference numbers of FIGS. 1 to 3 with the suffix "B" indicate parts, components and the like in a condition for laying the elongate member in a curved portion 34 of a trench.

Figure 1:
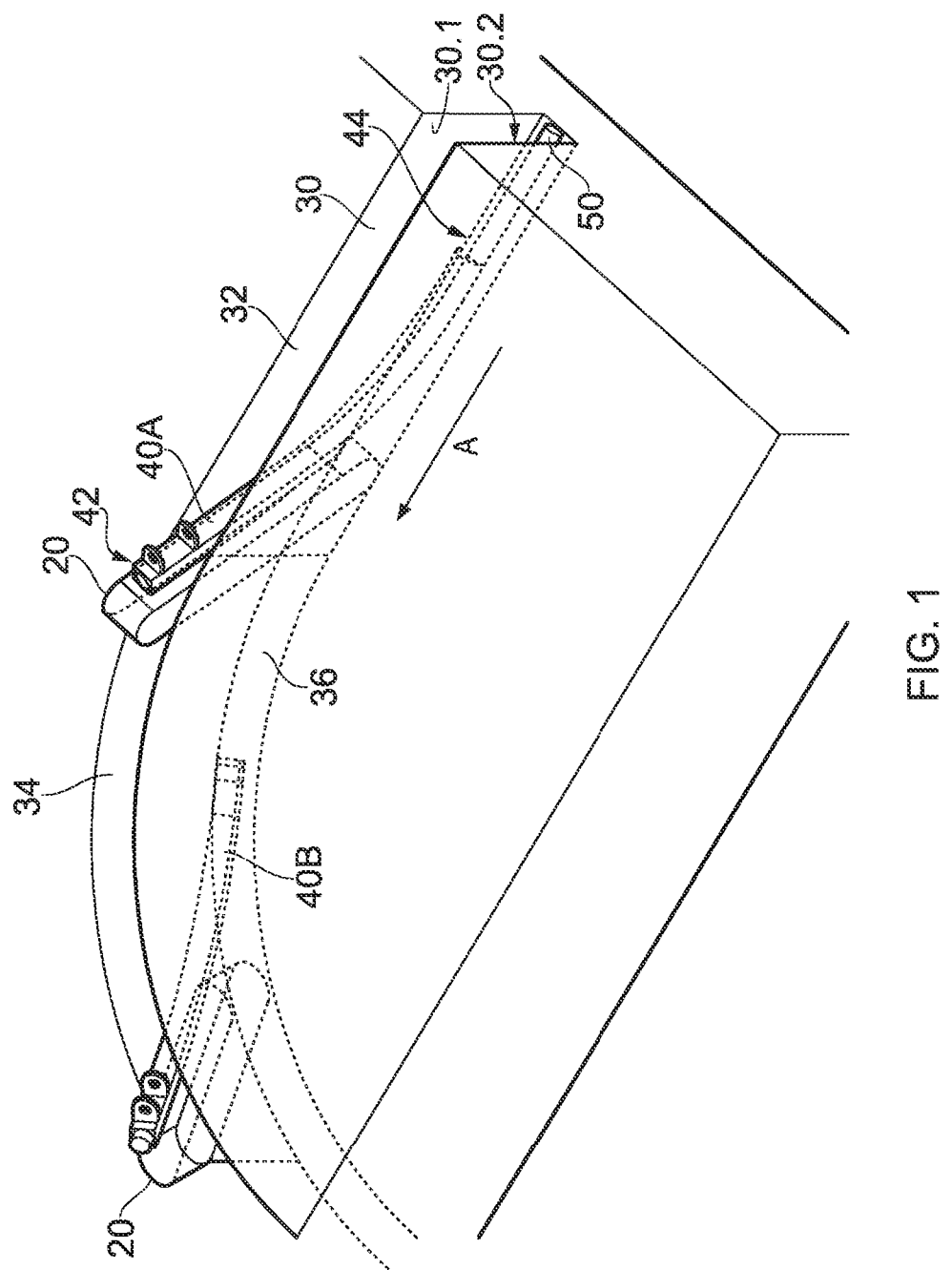
FIG. 1 is a schematic view showing a part of an apparatus for cutting a trench and laying an elongate member according to the present invention.
Figure 2:
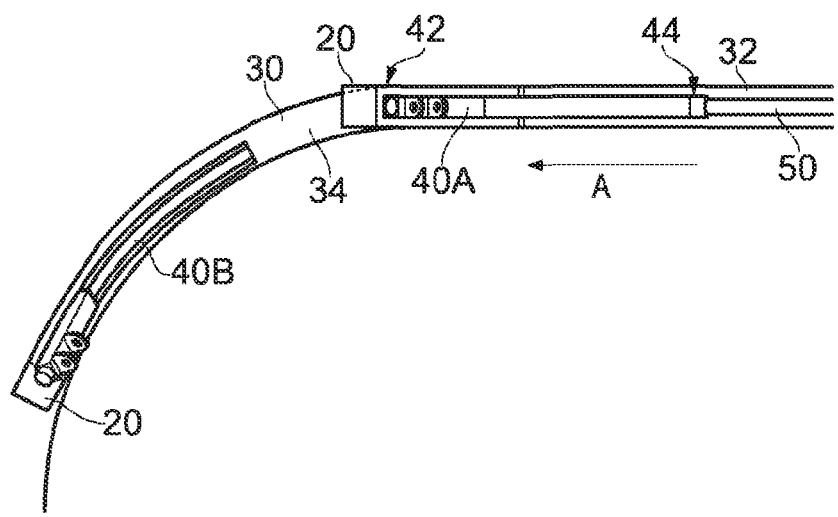
FIG. 2 shows the apparatus of the invention in plan view.

Referring now to FIGS. 1 to 3, a portion of an apparatus 100 for laying an elongate member 50 in a trench is illustrated. The elongate member 50 is typically a pipe or a cable, such as a power cable or a telecommunications cable and for ease of reference hereinafter the elongate member will be referred to as a "cable" and laying of the elongate member in the trench will be referred to a "cable laying", it being understood that references to "cable" encompass also other elongate members such as pipes.

In the embodiment illustrated in FIGS. 1 to 3, the apparatus 100 of the invention includes a trench cutting device 20 which is shown schematically. The trench cutting device is mounted in use, directly or indirectly, on a main body portion 110 of the cable laying apparatus 100. For clarity of illustration, apparatus 100 and main body portion 110 are not shown in FIGS. 1 to 3. The trenching device 20 per se may be of any suitable design as known in the art, including one or more of chain cutters, rock wheels, shearers and jetting apparatus and the like. The trench cutting apparatus 20 acts in use to cut a trench 30 which is illustrated in FIGS. 1 to 3 as having a linear portion 32 and curved portion 34. In preferred configurations, the walls 30.1 and 30.2 of the trench are substantially vertical. The walls 30.1 and 30.2 are opposed to one another and together with base or floor 36 define a substantially rectangular shaped trench 30. The direction of the apparatus 100 of the invention during trench cutting and cable laying operations is shown in FIGS. 1, 2 and 4 by arrow "A"

The apparatus of the invention includes a depressor 40. In the illustrated embodiment, the depressor 40 is shown mounted immediately behind (with respect to the direction of cable laying) the trench cutting device 20. The depressor 40 is attached, directly or indirectly, to the main body portion 110 of the apparatus 100. Typically the main body portion of the apparatus 100 includes a cable lifting and/or conveying mechanism which transfers cable 50 from an initial position to a cable laying position. For example, the cable 50 may initially be lying on the ground approximately along or adjacent the intended path of the trench. The cable conveying mechanism directs the cable 50 to the cable laying position at which the cable 50 is then in a configuration suitable to be received by a cable entry portion 42 of the depressor 40. As is known in the art, the primary function of depressor 40 is to guide the cable 50 from the cable laying position on the apparatus to the floor 36 of the trench 30 while ensuring that the cable 50 is protected from excessive bending which could result in cable damage.

Depressor 40 comprises a substantially rigid element, such as of metal construction, having a curved underside surface which bears against the cable 50 as it is transferred into the trench. The curved underside of the depressor may take the form of a channel or groove open at its lower face. The channel or groove engages the cable 50. The depressor is adapted such that the cable 50 need not be "captive" throughout the cable laying operation. Thus the cable can be engaged and disengaged from the depressor during the cable laying operation. Hence the depressor is distinct from cable laying apparatus of the prior art including, for example, apparatus configured for simultaneous lay operations wherein the cable remains continuously captive. Typically, the apparatus of the prior art configured for simultaneous lay operations prohibits the release of the cable ensuring it cannot be disengaged from the apparatus during the cable laying process. The cable 50 enters under the depressor 40 at a cable entry portion 42 and exits at a cable exit portion 44 distal from the entry portion 42.

Depressor 40 has a significant length, being much longer than its width. Thus, depressor 40 extends rearwardly of the cable laying apparatus (in particular of the trench cutting device 20 in the illustrated embodiment) by a significant length. When laying cable 50 in a linear trench portion 32 this configuration of the depressor 40 is appropriate. However, problems can arise when cable is laid in a curved trench portion 34 since the depressor 40 can contact a walls 30.1, 30.2 of the trench 30 and become stuck (wedged or jammed) so that cable laying operations are necessarily interrupted until the depressor 40 is freed.

In order to overcome this problem, the present invention provides that the depressor 40 is rotatable about an axis at least approximately parallel, and preferably substantially parallel to the longitudinal axis of the cable 50. In preferred configurations, the axis about which the depressor is rotatable is at least approximately, and preferably substantially, coaxial with a longitudinal axis of the cable 50. It is particularly preferred that the axis about which the depressor 40 can be rotated is substantially co-axial with the longitudinal axis of the cable 50 at the depressor entry portion 42. Achieving an exactly parallel orientation of the axis of rotation of the depressor 40 in relation to the longitudinal axis of the cable 50 may not be practically possible in the operating conditions and environment to which the apparatus is 100 is subjected. For example, the ground surface 130 may be uneven and/or the ground conditions experience by the trench cutting device 20 may be variable, leading to short term changes in the alignment of apparatus 100 with respect to the desired trench profile which must be accommodated. Hence although the apparatus of the inventions seeks to achieve the closest practical parallel alignment between the axis of rotation of the depressor 40 and the longitudinal axis of the cable 50 exact alignment may not be achieved and this is reflected in the use of the wording "at least approximately aligned" and "substantially aligned" (and similar grammatical forms) herein.

Rotation of the depressor 40 about the longitudinal axis of cable 50 is beneficial in preventing the possibility of a cable discontinuity in the cable path which may encroach on the minimum bend radius of the cable.

By rotation of the depressor 40 when approaching or when executing a turn in the trench, the curved configuration of the depressor 40 more closely matches the curve of the trench, so that contact between the depressor 40 and the walls 30.1, 30.2 of the trench is less likely to occur. Consequently, the likelihood of the depressor becoming stuck in the trench 30 is much reduced. When viewed from behind, for executing a left turn in the trench 30, the depressor 40 is rotated anti-clockwise (counter-clockwise) about the specified axis and for executing a right (starboard) turn in the trench 30, the depressor 40 is rotated clockwise about the specified axis.

For the purposes of rotating the depressor 40, suitable actuators 60, such as hydraulic actuators are disposed between the depressor 40 and the main body portion of the cable laying apparatus. The operation of the actuators 60 may be directly manually controlled, or the actuators 60 may be controlled by an automatic or semi-automatic control device.

In other embodiments, the rotation of the depressor 40 can be achieved by passive means such as coil springs or rubber springs configured to urge the depressor 40 towards a central (undeflected) position.

The degree of rotation of the depressor 40 can be measured by a suitable measurement device such as a Linear Variable Displacement Transducer (LVDT).

In some preferred embodiments, the extent of rotation of the depressor 40 is determined (for example by the control device) in relation to data concerning the degree of curvature of the trench. Such data may be data as used to determine the position of the trench cutting device 20 during cutting of the trench 30, or may be data relating to the position of steering equipment of the cable laying apparatus, for example.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. Apparatus for laying an elongate member in a trench having a curved trench portion, the apparatus comprising:
   a main body portion;
   ground-contacting apparatus on which the main body portion is mounted and by which the apparatus may in use move over the ground;
   a trench cutting device; and
   a depressor having a curved configuration, mounted immediately to the rear, with respect to the direction of trench cutting, of the trench cutting device and attached, directly or indirectly, to the main body portion, the depressor configured to guide the elongate member from an elongate member laying position to its in-trench location, the depressor having an elongate member entry portion and an elongate member exit portion,
   wherein the depressor is rotatable in use about an axis which is substantially co-axial with the longitudinal axis of the elongate member such that the curved configuration of the depressor more closely matches the curve of the curved trench portion.

2. The apparatus as claimed in claim 1 wherein the axis of rotation of the depressor is substantially co-axial with the longitudinal axis of the elongate member entry portion of the depressor.

3. The apparatus as claimed in claim 1 wherein the apparatus is configured for laying a pipe or cable in the trench.

4. The apparatus as claimed in claim 1 wherein the depressor is adapted to enable engagement and disengagement with the elongate member.

5. The apparatus as claimed in claim 1 wherein the apparatus further comprises trench cutting apparatus.

6. The apparatus as claimed in claim 5 wherein the trench cutting apparatus is selected from one or more of chain cutters, rock wheels, shearers and jetting apparatus.

7. The apparatus as claimed in claim 1 further comprising an elongate member moving device configured to move the elongate member from an initial position to the elongate member laying position.

8. A method of laying an elongate member into a curved portion of a trench the method comprising guiding the elongate member from an elongate member laying position of an elongate member laying apparatus to an in-trench location with a depressor having a curved configuration, and mounted, directly or indirectly, on the elongate member laying apparatus and adjusting the orientation of the depressor by rotating the depressor about an axis substantially co-axial with a longitudinal axis of the elongate member when said elongate member laying apparatus is at, or approaches, a curved portion of the trench, such that the curved configuration of the depressor more closely matches the curve of the curved trench portion.

9. The method as claimed in claim 8 wherein the elongate member laying apparatus further comprises trench cutting means, the method further comprising cutting the trench with said trench cutting means immediately prior to laying said elongate member in the trench.

* * * * *